United States Patent [19]

Hagen

[11] Patent Number: 5,062,869
[45] Date of Patent: Nov. 5, 1991

[54] WATER SEPARATOR FOR AIR DATA SENSOR

[75] Inventor: Floyd W. Hagen, Eden Prairie, Minn.

[73] Assignee: Rosemount Inc., Eden Prairie, Minn.

[21] Appl. No.: 596,735

[22] Filed: Oct. 10, 1990

Related U.S. Application Data

[63] Continuation of Ser. No. 412,907, Sep. 26, 1989, abandoned, which is a continuation-in-part of Ser. No. 320,416, Mar. 8, 1989, abandoned.

[51] Int. Cl.$^5$ .............................................. B01D 53/00
[52] U.S. Cl. ........................................ 55/159; 55/213; 55/269
[58] Field of Search .................... 55/46, 159, 267, 269, 55/270, 274, 213

[56] References Cited

U.S. PATENT DOCUMENTS

| | | | |
|---|---|---|---|
| 3,469,369 | 9/1969 | Helmke | 55/46 |
| 3,523,408 | 8/1970 | Rosenberg | 55/159 |
| 3,778,971 | 12/1973 | Granger et al. | 55/159 |
| 3,926,594 | 12/1975 | Seib et al. | 55/159 |
| 4,645,517 | 2/1987 | Hagen et al. | 55/182 |
| 4,702,753 | 10/1987 | Kowalczyk | 55/267 |

Primary Examiner—Charles Hart
Attorney, Agent, or Firm—Kinney & Lange

[57] ABSTRACT

A water separating device for a pressure measurement such as static, pitot measurement system provides a plurality of ports therethrough such that water, snow and ice from atmospheric air is substantially removed therefrom so that desired parameters such as temperature or pressure can be measured. Separation of water, snow and ice as disclosed eliminates additional chambers for collecting same and eliminates drain systems and drain valves to eliminate same from the measurement system. Since sensors are not exposed to moisture, sensor dependability and longevity is enhanced.

15 Claims, 6 Drawing Sheets

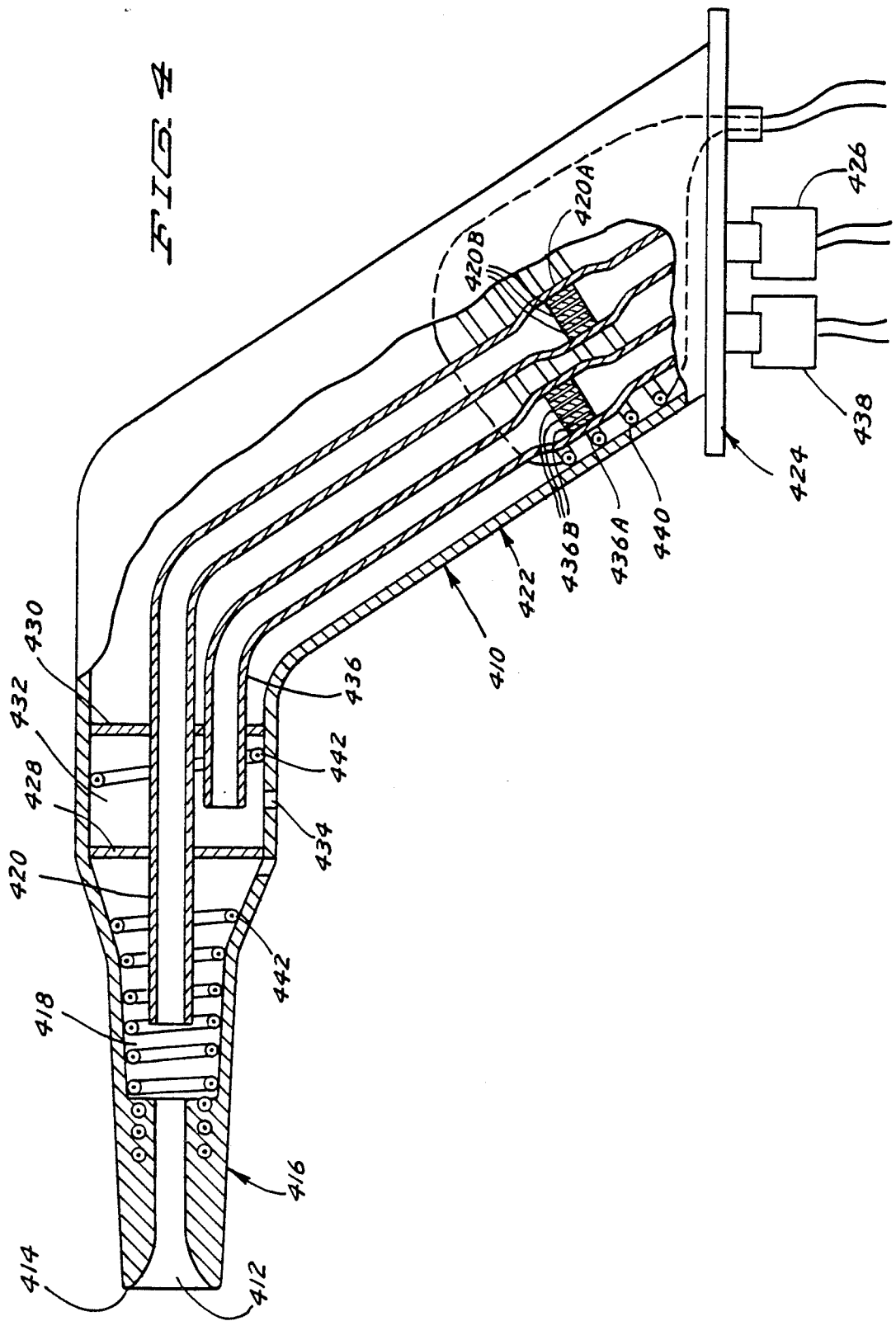

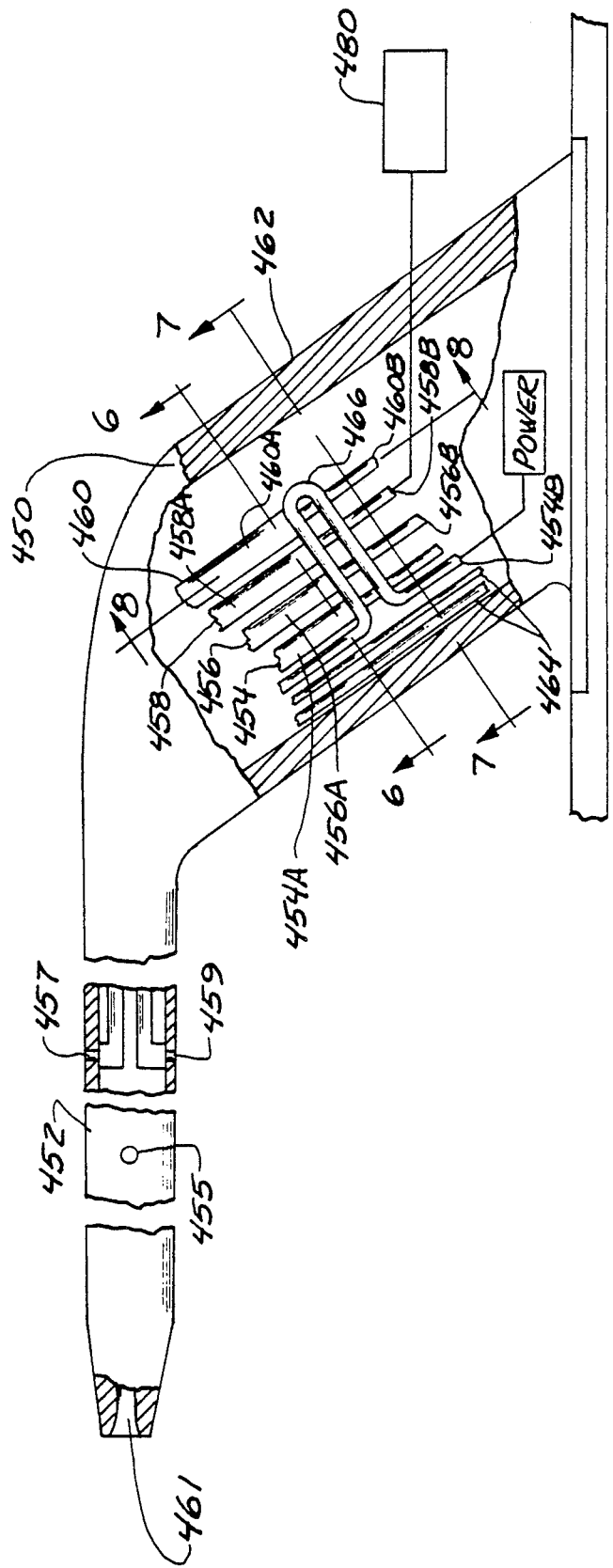

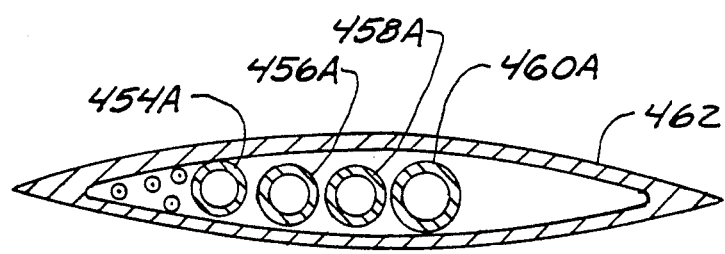
FIG.6
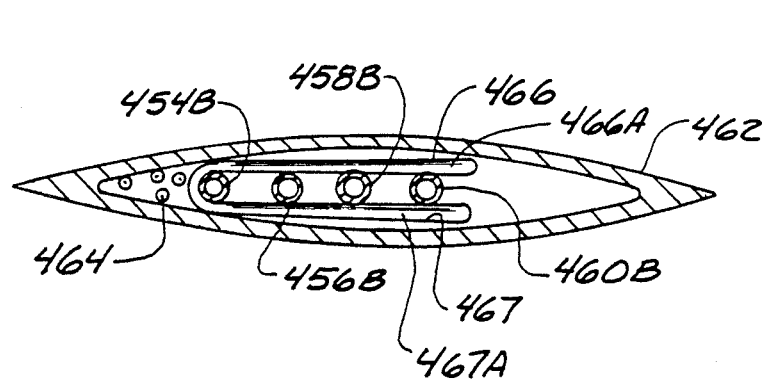
FIG.7
FIG.8
FIG.9
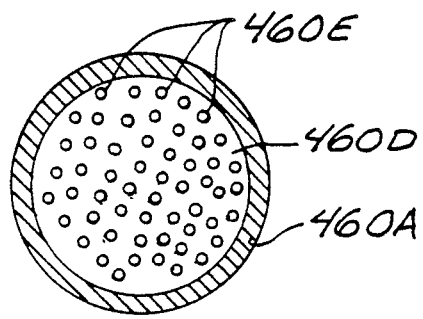
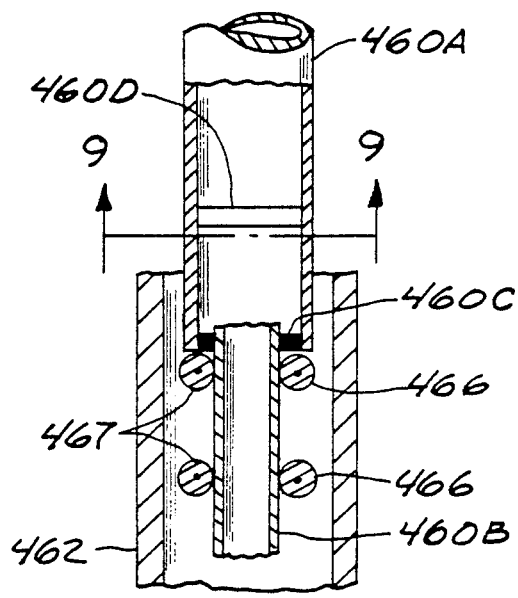

WATER SEPARATOR FOR AIR DATA SENSOR

This application is a continuation of application Ser. No. 07/412,907, filed on Sept. 26, 1989, abandoned as of the date of this application, which in turn is a continuation-in-part of my copending U.S. patent application Ser. No. 07/320,416, filed Mar. 8, 1989 for Water Separator For Air Data Sensor, now abandoned.

BACKGROUND OF THE INVENTION

1. Field of the Invention

The present invention relates to removal of water, snow and ice from air in the passageway of air data sensors, and to pressure and temperature measurements of such air.

2. Prior Art.

In the prior art, removal of water, snow and ice from atmospheric air has been a long standing problem which has often been addressed by a water trap system. Such system is shown in U.S. Pat. No. 3,926,594 to Seib et al. Seib teaches an inlet with an elevated outlet wherein the air and water mixture are separated in an inner chamber. Drain holes in the inner chamber permit water to drain into the outer chamber. A further drain opening is provided in the outer chamber for draining the water from the outer chamber.

Drain manifolds such as shown in U.S. Pat. No. 4,645,517 to Hagen et al., the inventor of the instant invention have been useful in relieving an aircraft of excess water in such systems.

The above described systems and manifolds require piping and various mechanical apparatus to rid the air vehicle of water. The instant invention reduces such piping and mechanical apparatus while eliminating the undesired water, snow and ice.

SUMMARY OF THE INVENTION

The present invention relates to measuring selected parameters of air and more particularly for measuring air from the atmosphere. Such air may contain water or ice. The invention includes a housing which has an aperture that opens to the atmosphere. The housing defines a passageway leading from the aperture to a suitable sensor, such as a pressure sensor for measuring a parameter of the air. A water separating device is disposed in the passageway for separating water and ice from the air. The water separating device has ports formed such that air flow is not substantially restricted but water and ice do not flow therethrough. All weather performance is improved by the addition of a heater which is heat transfer coupled to the water separating device so that water or ice disposed thereon is vaporized.

In one form the housing has a closed vessel therein. The vessel has an opening which is coupled to a passageway which is further coupled to the aperture to provide a pneumatic path. A sensor can be disposed in the vessel for measuring a desired parameter such as pressure, temperature or static pressure as desired. Suitable connections are provided for providing the measurement to desired equipment or readout devices.

With the water separating device disposed as disclosed conventional drain cocks are eliminated. Further sensor performance is enhanced as water does not contact the sensor.

BRIEF DESCRIPTION OF THE DRAWINGS

FIG. 1 is a sectional view of one of the preferred embodiments made according to the present invention;

FIG. 3 is a partial sectional view of yet another preferred embodiment made according to the present invention;

FIG. 4 is an elevational view with parts broken away of yet another preferred embodiment of the present invention in the pneumatic lines of a pitot-static tube;

FIG. 5 is a fragmentary elevational view of a pitot static tube utilizing a further form of the invention with parts in section and parts broken away;

FIG. 6 is a sectional view taken on line 6—6 in FIG. 5;

FIG. 7 is a sectional view taken on line 7—7 in FIG. 5;

FIG. 8 is a sectional view taken on line 8—8 in FIG. 5; and

DESCRIPTION OF THE PREFERRED EMBODIMENT

Figure 2:
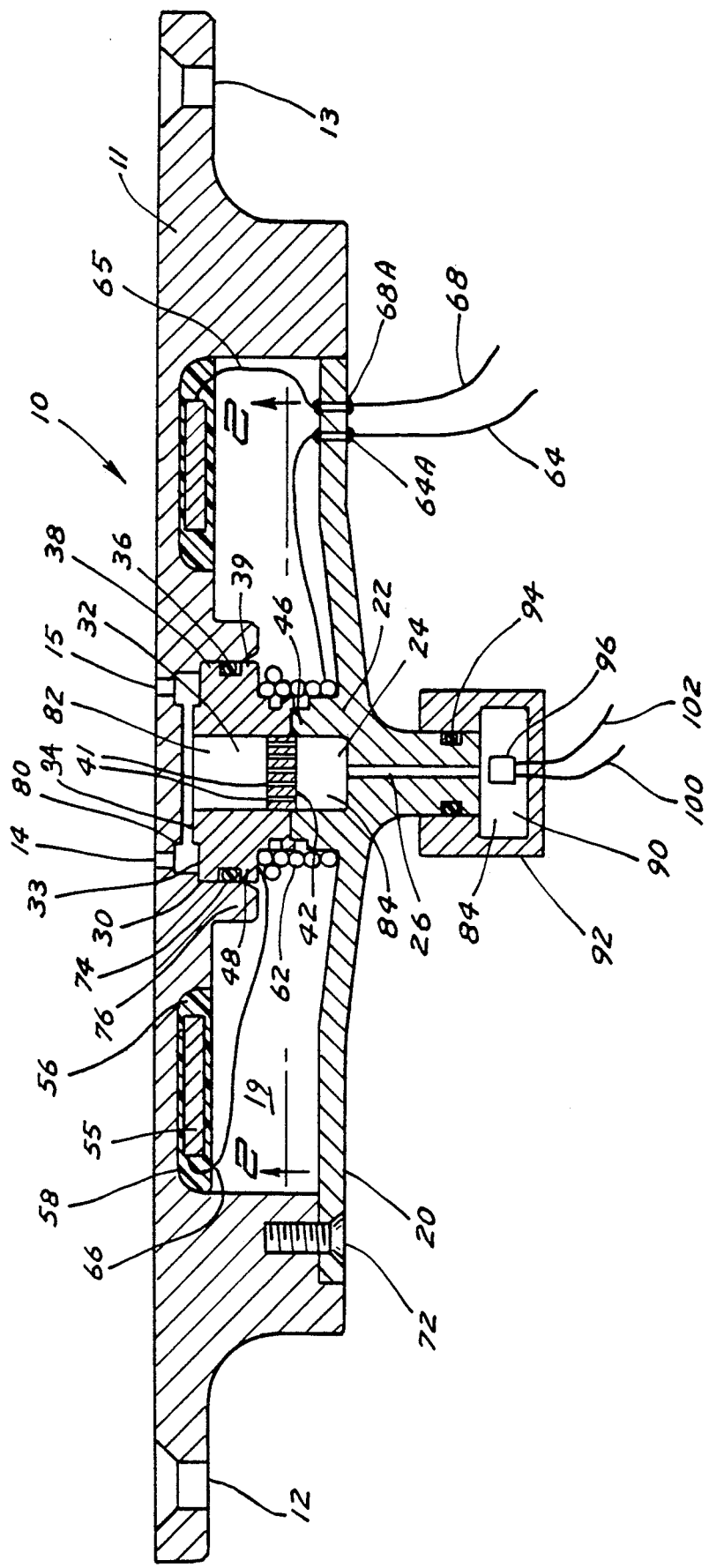
FIG. 2 is a plan view taken as on line 2—2 in FIG. 1 with parts broken away.
Figure 2:
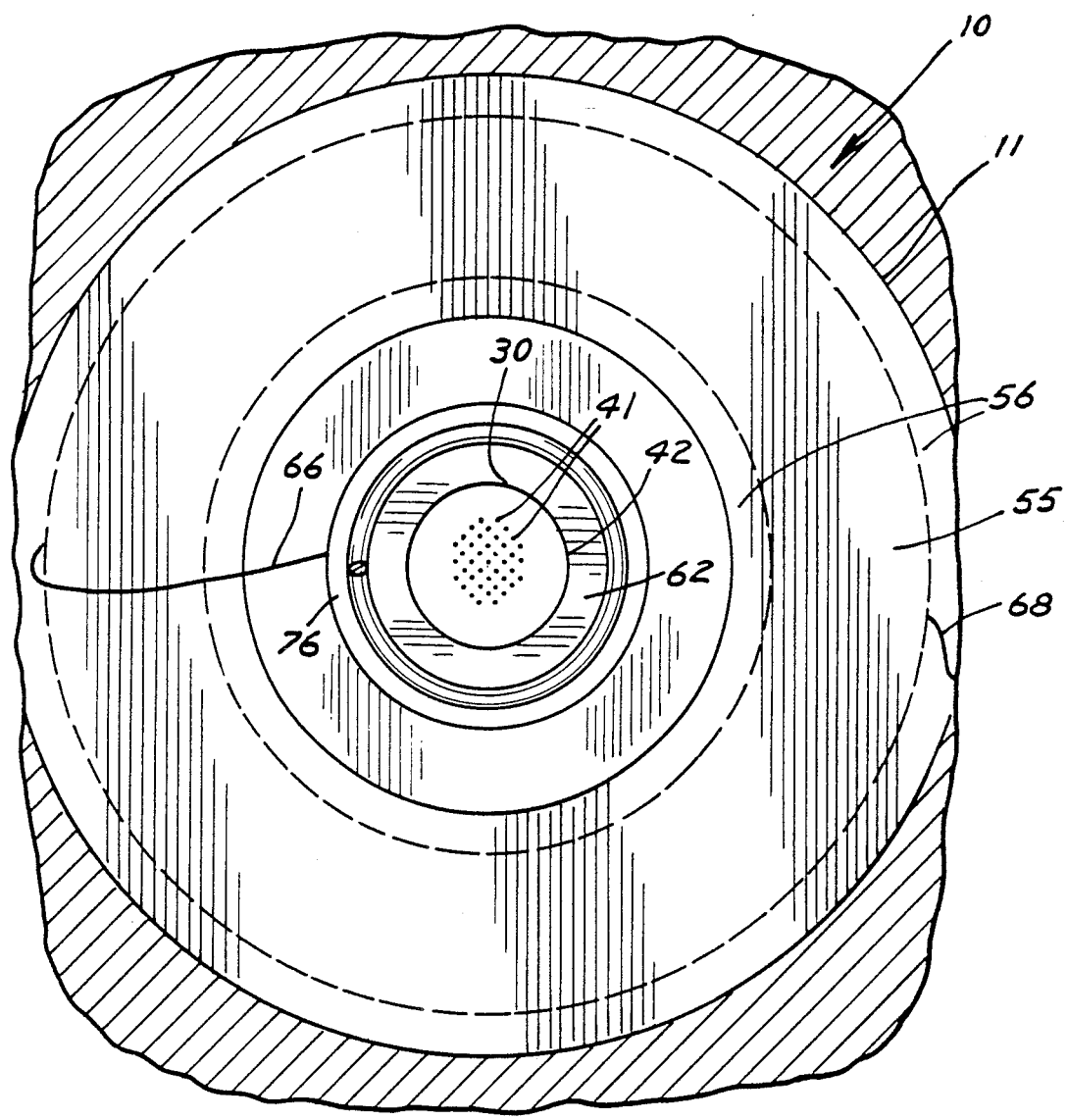

In FIGS. 1 and 2, a general layout of a water separating device according to the present invention is shown. Such device is indicated generally at 10, and includes an outer housing 11 that provides a base for mounting the device and other associated components on an air vehicle or other installation where a desired parameter is measured. Bores 12 and 13 provide for mounting device 10 flush with the air vehicle exterior. Outer housing preferably is formed from aluminum Static ports 14 and 15 are formed in housing 11. Two static ports are shown, however, typically a plurality of six or more such ports are used. A chamber 19 is also formed in housing 11. An inner housing 20 is formed from aluminum. Inner housing 20 has an inner annular ring 22 and a recess 24 formed therein. A bore 26 through the center of inner housing couples to a recess 24 to sensor housing 92.

Water separating means 30 is also formed from a block of aluminum. A large bore is cut into means 30 forming a cavity 32. Further machining on the upper periphery face 33 of water separating means 30 results in an annular baffle 34 on the upper face of means 30. An O-ring groove 36 is formed in the water separating means 30 by two annular rings 38 and 39. A plurality of ports 41 are formed as by drilling or other suitable means in the lower end 42 of means 30. The dimensions, shapes and pattern of these ports are selected so that air will pass therethrough but water, snow and ice are substantially stopped from passing therethrough. One such preferred embodiment is shown in FIG. 2. The quantity of ports is selected so that the pneumatic lag caused by the small size of such ports is acceptable for the measured parameters. In one preferred embodiment it was found that circular shaped ports having a diameter of 0.016 inches with a tolerance of 0.001 inches rejected all water and ice and a quantity of forty-one such ports provided adequate response time for a static pressure measurement on an air vehicle. However, diameters of 0.01 inches to 0.03 inches have been also used. It is understood that other ports of different shapes and diameters will similarly adequately reject water, ice and snow, and that a different quantity of ports will provide different but acceptable response times for static pressure or temperature measurements. The pattern of these ports is selected so that water droplets formed on the upper surface thereof do not block an unacceptable quantity of ports.

Inner housing 20 is joined, as by TIG welding at 46 to water separating means 30 forming the water separating assembly 48. A donut shaped electric heater disc 55 encapsulated in an electrically insulating preferably thermally conductive potting compound 56 is then disposed on the inside surface 58 of outer housing 11. A separate coiled heater 62 having an electrical insulator disposed on the exterior thereof is then wrapped around assembly 48. Power for disc 55 and heater 62 is provided by means of a first leadwire 64 to heater 62, a second leadwire 66 from heater 62 to disc 55 and a third leadwire 68 from disc 55. Leadwires 64 and 68 are then connected through water separating assembly 48 using feedthrough 64A and 68A respectively, to a suitable power supply. Heater 62 heats the water separating means 30 to eliminate ice and snow and to boil off water formed thereon thus keeping ports 41 free of water, ice and snow so that air may pass therethrough. Heater 62 is included in one preferred embodiment but is not required where water, snow and ice conditions are such that such heater is not required for existent operating conditions. Disc 55 heats outer housing 11 and static ports 14 and 15 and is included as required by operating conditions. Heating can also be provided by suitable ducting from engine bleed air to the device 10 using known techniques.

Assembly 48 is then inserted into chamber 19 of outer housing 11. Suitable connectors as screws 72 affix assembly 48 in position. O-ring 74 in O-ring groove 36 is coupled to flange 76 of inner housing 11 to provide a pneumatic seal. In operation, atmospheric air at static pressure then enters static ports 14 and 15. Baffle 34 provides a barrier to particulate material of a desired size. The atmospheric air then enters a passageway means 82 formed by wall 80 and cavity 32. The atmospheric air is then screened of water, snow and ice and other particulate matter by ports 41 and the air without such water, snow and ice then enters vessel 84 which is formed by recess 24, bore 26 and chamber 90 of sensor housing 92. Sensor housing 92 is suitably coupled to assembly 48. O-ring 94 pneumatically seals vessel 84 for static pressure measurements. Sensor 96 may be a pressure, temperature or other type of sensor, but preferably is a sensor for detecting static pressure or other pneumatic pressure. Such sensor has suitable leadwires 100 and 102 for sensor excitation and readout. Sensor 96 in one preferred embodiment is disposed in vessel 84 but sensor 96 may also be coupled to vessel 84 using conventional plumbing such as to U.S. Pat. No. 4,311,053 to first pressure inlet 20. Second pressure inlet 21 is then pinched off or bellows 16 can be eliminated as desired so that the vibrating beam is responsive to pressure changes.

FIG. 3 is another preferred embodiment of the present invention. A static pressure assembly is shown generally at 310. In this embodiment it is understood the construction of assembly 310 is similar to FIG. 1. Airflow in this embodiment is through static ports 314 and 315, and through the passageways 314A and 315A to the ports 341 on water separator means 330. Water, snow and ice are removed from the atmospheric air by ports 34 and air passes therethrough to vessel 384 which is formed by a large bore 384A, a smaller bore 384B and an annular ring 384C in water separating means 330 and a passageway 384D in an inner housing 320. Vessel 384 is closed by an external coupling which attaches to fitting 387. The sensor is then suitably disposed in or on vessel and the external coupling is in turn pneumatically sealed to static pressure. In this embodiment air then passes through ports 341 to the outer periphery of bore 384A. If water should pass through ports 341 it impinges on plate 390 and such water would then be trapped between the outer periphery of bore 384A and passageway 384D by stand pipe 392 as shown at 394. Such water is then boiled off by heater 362. This additional water barrier thus affords additional protection for elimination of water and for elimination of condensation without exposing the sensor to such water. Air with the water removed enters passageway 384D through ports 400. The external face and ports 314 and 315 are heated by disc 355. Disc 355 and heater 362 are powered as described in the preferred embodiment of FIG. 1.

FIG. 4 is another preferred embodiment of the present invention. A pitot-static sensing probe is shown generally at 410. A pitot port 412 is provided in the leading end 414 of the barrel portion 416 of probe 410, which pitot port opens into a pitot pressure chamber 418 that contains a first pneumatic line comprising a pitot pressure tube 420. The pitot pressure tube 420 extends through the interior of the barrel portion 416 and strut portion 422 of probe 410 terminating outside the probe base 424, at which location a sensor 426 is suitably connected to provide a pneumatic seal for sensing the pitot pressure.

A first bulkhead 428 and a second bulkhead 430 are disposed within the barrel portion 416 to define a static pressure chamber 432 which is open to the atmosphere through one or more static ports 434. Static pressure chamber 432 contains a second pneumatic line comprising a static pressure tube 436 which extends through the interior of the barrel 416 and strut 422 of the probe terminating outside probe base 424, at which location a sensor 438 is suitably connected to provide a pneumatic seal for sensing the static pressure.

Water separating means 420A and 436A, each having a plurality of ports 420B and 436B, are disposed in the pitot pressure tube 420 and static pressure tube 436 respectively. The water separating ports 420B and 436B are selected to have a size, shape and distribution pattern to freely permit a flow of air therethrough, while substantially preventing passage therethrough of water. If desired, the pitot and static pressure tubes 420 and 436 can be provided with expanded regions to accommodate larger water separating means 420A and 436A, as illustrated. Heater means 440 is disposed within probe 410 in thermal communication with water separating means 420A and 436A to boil off water and can be electrically powered independent of or in series with electric deicing heater 442 disposed in the barrel 416, as desired.

If desired, sensors 436 and 438 can be disposed in the pitot pressure and static pressure tubes, downstream of water separating means 420A and 436A, respectively. The present invention can also be used, for example, in flow angle measurement applications.

The invention is useful for air vehicles such as aircraft, missiles, space vehicles to measure static, flow angle or pitot pressure and for stationary sites for meteorological requirements.

The invention as disclosed is smaller than existent systems for water removal. This results in less weight and less cost than existent systems all of which results in improved air vehicle performance, such as less fuel consumption, greater payload. These factors are particularly important since typically there are multiple static and pitot static systems on each aircraft, hence multiplying the improved performance by the number of required systems. The invention also affords reduced pneumatic lag; and, hence, a faster response as the sensor is located proximate to the static port thus eliminating long pneumatic transmission lines and reducing the time lag for small pressure changes to be sensed through such extended pneumatic transmission lines.

Water separation as provided by the ports in the water separation means occurs as water on the surface of the separation means forms a bond with other molecules of water to form a meniscus or drops. The size or shape and pattern of the ports is selected so that when combined with a heater as desired sufficient holes remain open to air flowing therethrough so that pneumatic lag is predetermined and acceptable. The time constant or pneumatic lag (T) is a function of the length of the ports (I) and the volume of vessel 84 (V), and an inverse function of the quantity of ports (NJ and of the effective diameter of round ports to the fourth power ($d^4$) or $T = f(1V/Nd^4)$. For ports other then cylinders the effective diameter may be determined by known methods.

A further modified form of the invention is shown in FIGS. 5 through 8, and as shown in a probe 450 is of a known design which measures not only pitot and static pressure, but also angle of attack, and which has sensing ports on the barrel in a conventional manner. Each of the ports that is used opens to a separate line forming a passageway for fluid pressures sensed at the barrel 452. These lines or passageways include a first passageway 454 comprising a tube or line that may carry static pressure from a port 455; a second passageway formed in a tube or line 456 may carry a first angle sensitive pressure signal from a port 457, a third tube or line 458 has an internal passageway that may carry a second angle sensing signal from a port 459, and a fourth tube or line 460 has an internal passageway which may carry the pitot pressure signal from a port 461. Each of these tubes or lines 454, 456, 458 and 460 is substantially identically constructed in the strut region indicated at 462 and is shown at FIG. 5.

As can be seen in FIG. 6, the tubes 454-460 are positioned generally parallel and have circular cross sections, while the strut section 462 is a generally flattened shape, and has an interior chamber in which the tubes rest. A heater assembly indicated at 464 is provided with a number of individual heater wires, including a pair of U-shaped heater wires 466 and 467 which rest against and heat portions of the tubes 454-460 as will be explained. These tube sections and heaters are shown in FIGS. 7 and 8.

In FIG. 8, the tube 460 is shown, in cross section as typical for the other tubes forming pressure passageways. Tube 460 has a large diameter section 460A, that varies fluid pressure, and a smaller diameter section 460B is brazed in place at a junction of the tube section to form an offset in diameters generally at a region shown at 460C. This junction is sealed so fluid cannot escape. Each of the tubes 454, 456 and 458 also has a large counter portion 454A, 456A and 458A, respectively and small diameter portions 454B, 456B and 458B.

Figure 9:
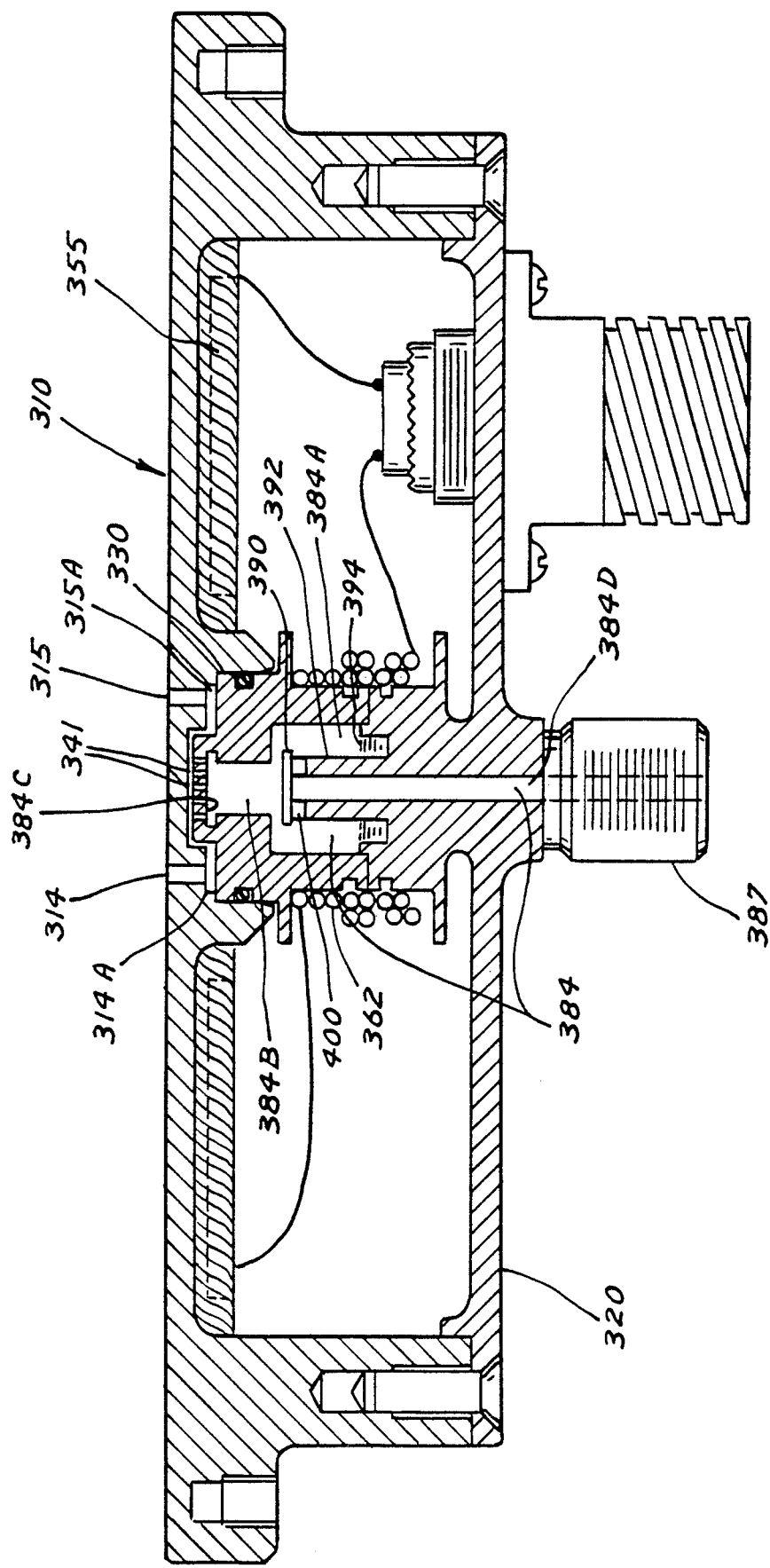
FIG. 9 is a sectional view taken on line 9—9 in FIG. 8.

Water separating means 460D is mounted in the tube section 460A and spaced upstream from the junction 460C. The water separator means 460D (the same water separator means is each of the tube sections 454A, 456A and 458A) is brazed or tacked in place, to substantially seal the perimeter relative to the inner surface of the tube section 460A and has a plurality of ports indicated at 460E in FIG. 9.

The heater wires 466 and 467 are formed into loops 466A and 467A that are generally U-shaped and have spaced leg portions that rest against and heat the smaller diameter tube sections 454B, 456B and 458B and 460B. The heat from the heater loop sections is conducted to these tubes. Note, also, that one leg of each of the U-shaped heater wire sections rests against the braze connection at junction portion 460C, and each of the junction portions for the other tubes 454-458.

The water separating means and the water separating means that is in each of the tubes 454, 456 458, and 460, is selected to have a size, shape and distribution pattern to freely permit a flow of air therethrough, while substantially preventing passage of water, snow or ice therethrough. The heater loops 466A and 467A are in thermal contact with the tubes so they will tend to boil off any water, and melt any ice or snow that collects on the water separating means 460D (and the water separation means in each of the tubes 454, 456 and 458). The water separating means 460D, which is typical, is preferably a heat conductor, such as metal, so that any snow or ice contacting this metal water separating means will be heated above the melting point and the liquid will be boiled off. The heater loops 466A and 467A are resting against the tube sections 454B, 456B, 458B and 460B so a high temperature is reached. The openings in the water separating means will provide for passage of air there.

Water separation, as provided by the ports through the water separation means in the individual passageways formed by the tubes 454, 456, 458, and 460, occurs as water on the surface of the separation means forms a bond with other water to form a meniscus or water drops. The pattern of the ports is selected so that efficient holes remain open for air flowing therethrough or pressure to act therethrough so that the pneumatic lag is predetermined and acceptable. The time constant, as stated in the previous form of the invention, is the function of the length of the ports and the volume of the sensing chamber or vessel that receives the fluid pressure.

In the present form of the invention, each of the tubes 454, 456, 458 and 460 carry a pneumatic signal back to a pressure sensing chamber that comprises a vessel. A typical chamber or vessel is illustrated at 480. Each of these individual pressure signals is carried to a separate sensor chamber or vessel.

The invention as disclosed results in yet further improvements of performance as the flush mounting of the first form of the invention reduces drag, and provides a sleek outer airframe resulting in reduced radar reflectivity. The flush mounting also reduces the occurrences of physical damage in the air from foreign object damage (FOD) and on the ground from other physical damage. In the probes shown, the use of the water separating means reduces size by avoiding separate drain chambers and also reduces weight.

Although the present invention has been described with reference to preferred embodiments, workers skilled in the art will recognize that changes may be made in form and detail without departing from the spirit and scope of the invention.

What is claimed is:

1. Apparatus coupled to the atmosphere for providing air from which water has been separated such that at least one parameter of the air can be measured, comprising:
   a housing having an aperture which opens to the atmosphere;
   a chamber having an opening to receive the air to be measured from the housing;
   the housing providing passageway means coupling air from the aperture to the opening; and
   water separating means disposed in the passageway means having an airflow port therethrough, the water separating means preventing air from moving through the passageway except through the port, which port is configured to substantially prevent water from passing therethrough.

2. Apparatus in accordance with claim 1 wherein the port comprises a plurality of holes.

3. Apparatus in accordance with claim 2 wherein each of the holes has dimensions which are selected so that air is transmitted therethrough.

4. Apparatus in accordance with claim 3 wherein the dimensions of each of the holes is further selected so that water is substantially rejected by the holes.

5. Apparatus in accordance with claims 1, 2, 3 or 4 further comprising sensing means in communication with the air in the chamber for measuring a desired parameter.

6. Apparatus in accordance with claim 5 wherein the sensing means is a pressure sensor.

7. Apparatus in accordance with claims 1, 2, 3 or 4 further comprising heating means disposed in the housing and coupled to the water separating means for removing ice or water therefrom.

8. Apparatus in accordance with claim 5 wherein the sensing means is a vibrating beam pressure sensor.

9. Apparatus for removing water from a pneumatic line comprising water separating means disposed in the line and having a plurality of ports for freely permitting the flow of air therethrough, such ports further having a shape selected such that water substantially does not pass therethrough, and heating means disposed relative to the separating means and in thermal communication therewith with sufficient heat capacity so that water formed on the ports is vaporized.

10. The apparatus according to claim 1 wherein said housing comprises an air data sensing probe for mounting on an aircraft, having a barrel and a strut, said barrel having the aperture therein, and the passageways means comprising a tube passing through a central opening in the strut and leading to the chamber comprising a sensor housing, the water separating means being disposed within the tube between the aperture and the chamber, and heater means for heating the air data sensor including a heater portion in thermal contact with the tube adjacent the water separating means to melt ice or snow and tend to vaporize water adjacent the water separating means.

11. The apparatus in accordance with claim 10 wherein said air data sensing means has a plurality of tubes therethrough, and each of said tubes having water separating means therein, the heater portion contacting each of the tubes to conduct heat thereto.

12. The apparatus as specified in claim 10 wherein said tube comprise first and second tube sections, said first tube section being of a larger diameter than the second tube section and having the water separating means mounted therein, said water separating means comprising a disc extending transversely to the first tube section and having the port therethrough comprising a plurality of openings through the disc, and said second tube section being sealed with respect to and leading from the first tube section adjacent said water separating means.

13. The apparatus as specified in claim 12 wherein said heater portion is provided on both sides of said tubes, and is in contact with the second tube section adjacent the junction between the first and second tube sections.

14. Air data sensing apparatus having a sensing port open to the atmosphere for sensing at least one parameter comprising:
   passageway means in said apparatus coupled to said port for carrying fluid pressure signals from the exterior of the apparatus to a sensing chamber; and
   water separating means disposed in the passageway comprising a member spanning the passageway and having an airflow port therethrough, the port being of size to substantially eliminate water passage therethrough while permitting air pressure signals to pass therethrough to the chamber.

15. The apparatus as specified in claim 14 wherein said apparatus comprises an air data sensing apparatus for mounting on an air vehicle and having the sensing port open to the exterior of the air vehicle, the passageway carrying the water separating means being in contact with a heater which generates sufficient heat to melt solid phases of water held by said water separating means, and to vaporize liquid water that is retained by the water separating means.

* * * * *

UNITED STATES PATENT AND TRADEMARK OFFICE
CERTIFICATE OF CORRECTION

PATENT NO. : 5,062,869

DATED : November 5, 1991

INVENTOR(S) : Floyd W. Hagen

It is certified that error appears in the above-identified patent and that said Letters Patent is hereby corrected as shown below:

Col. 2, line 34, after "housing", and insert --11--.

Col. 3, line 67, delete "ports 34" and insert --ports 341--.

Signed and Sealed this

Sixth Day of April, 1993

*Attest:*

STEPHEN G. KUNIN

*Attesting Officer*   Acting Commissioner of Patents and Trademarks